United States Patent
Li et al.

(10) Patent No.: US 11,257,022 B2
(45) Date of Patent: Feb. 22, 2022

(54) COMPUTING SYSTEM AND METHODS PROVIDING SUPPORT SESSION ASSIGNMENT BETWEEN SUPPORT AGENT CLIENT DEVICES AND CUSTOMER CLIENT DEVICES

(71) Applicant: CITRIX SYSTEMS, INC., Fort Lauderdale, FL (US)

(72) Inventors: Qiming Li, Jiangsu (CN); Shengchi Zhang, Jiangsu (CN); Lu Sun, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/860,420

(22) Filed: Apr. 28, 2020

(65) Prior Publication Data
US 2021/0304108 A1     Sep. 30, 2021

Related U.S. Application Data

(63) Continuation of application No. PCT/CN2020/082260, filed on Mar. 31, 2020.

(51) Int. Cl.
*G06Q 10/06* (2012.01)
*G06Q 30/00* (2012.01)
(Continued)

(52) U.S. Cl.
CPC .......... *G06Q 10/06398* (2013.01); *G06Q 10/063112* (2013.01); *G06Q 10/063114* (2013.01);
(Continued)

(58) Field of Classification Search
CPC combination set(s) only.
See application file for complete search history.

(56) References Cited

U.S. PATENT DOCUMENTS 9,424,554 B2     8/2016  Hayton et al.
10,275,802 B1 *  4/2019  Ross ................. G06Q 30/0269
(Continued)

FOREIGN PATENT DOCUMENTS

WO     WO-2017111653 A1 *  6/2017  ............ H04M 3/487

*Primary Examiner* — Crystol Stewart
(74) *Attorney, Agent, or Firm* — Allen, Dyer, Doppelt + Gilchrist, PA

(57) ABSTRACT

A computing system may include a plurality of first client devices associated with customers, a plurality of second client devices associated with support agents, and server configured to communicate with the first and second client devices. The server may establish support sessions between the first client devices and the second client devices via a communications network based upon customer support requests from the first client devices, collect customer feedback data on the support agents from the first client devices responsive to the support sessions, collect support agent feedback data on the customers from the second client devices responsive to the support sessions, rank the support agents based upon the customer feedback, rank the customers based upon the support agent feedback, and assign the support agents to customers as customer requests are received based upon the rankings of available support agents and the rankings of the customers making the customer requests.

17 Claims, 10 Drawing Sheets

(51) Int. Cl.
*H04M 3/00* (2006.01)
*H04M 3/523* (2006.01)

(52) U.S. Cl.
CPC ............ *G06Q 30/016* (2013.01); *H04M 3/00* (2013.01); *H04M 3/5232* (2013.01); *H04M 3/5233* (2013.01); *H04M 2203/402* (2013.01)

(56) References Cited

U.S. PATENT DOCUMENTS

| | | | | |
|---|---|---|---|---|
| RE48,412 E | * | 1/2021 | Chishti | H04M 3/5238 |
| 2004/0101127 A1 | * | 5/2004 | Dezonno | H04M 3/523 |
| | | | | 379/265.02 |
| 2005/0114379 A1 | * | 5/2005 | Lee | G06Q 10/10 |
| 2007/0025540 A1 | * | 2/2007 | Travis | H04M 3/5232 |
| | | | | 379/219 |
| 2008/0027787 A1 | * | 1/2008 | Malsbenden | G06Q 30/0631 |
| | | | | 705/7.29 |
| 2012/0051537 A1 | * | 3/2012 | Chishti | H04M 3/5233 |
| | | | | 379/265.11 |
| 2014/0119532 A1 | * | 5/2014 | Marghescu | H04M 3/5183 |
| | | | | 379/265.09 |
| 2016/0142541 A1 | * | 5/2016 | Sharpe | H04M 3/5141 |
| | | | | 379/92.01 |
| 2017/0109681 A1 | * | 4/2017 | Zhao | G06Q 10/06398 |
| 2017/0111509 A1 | * | 4/2017 | McGann | H04M 3/5232 |
| 2018/0374000 A1 | * | 12/2018 | Herzig | G06N 5/02 |
| 2019/0052584 A1 | * | 2/2019 | Barve | G06Q 30/016 |
| 2020/0151648 A1 | * | 5/2020 | Gorny | G06Q 10/063112 |
| 2021/0117902 A1 | * | 4/2021 | Veloso | G06Q 10/063112 |

* cited by examiner

COMPUTING SYSTEM AND METHODS PROVIDING SUPPORT SESSION ASSIGNMENT BETWEEN SUPPORT AGENT CLIENT DEVICES AND CUSTOMER CLIENT DEVICES

BACKGROUND

Customer support is an important service that computer and network infrastructure providers, among others, offer to users. Customer support systems allow such providers to connect with customers via a communications network to assist them with numerous technical issues such as configuration, connectivity, outages, etc. Furthermore, customer support systems may also allow such providers to provide support in other areas, such as education/training, as well as contract/billing issues. Some customer support systems also allow for the automated collection of customer feedback regarding support agent performance.

SUMMARY

A computing system may include a plurality of first client devices associated with customers, a plurality of second client devices associated with support agents, and a server configured to communicate with the first and second client devices. The server may establish support sessions between the first client devices and the second client devices via a communications network based upon customer support requests from the first client devices, collect customer feedback data on the support agents from the first client devices responsive to the support sessions, collect support agent feedback data on the customers from the second client devices responsive to the support sessions, rank the support agents based upon the customer feedback, rank the customers based upon the support agent feedback, and assign the support agents to customers as customer requests are received based upon the rankings of available support agents and the rankings of the customers making the customer requests.

In an example embodiment, the server may be further configured to add the support agents to an assignment queue, remove the support agents from the assignment queue upon assignment to a customer, and add the support agents back to the assignment queue after the assignment queue is empty. In accordance with another example, the support agents and customers may be ranked on a common numerical scale, and the server may assign the support agents to customers having the closest ranking to one another on the common numerical scale.

The support agents may be divided into a plurality of different groups, and the server may be configured to collect different support agent feedback data on the customers from the different groups of support agents, for example. In an example implementation, the server may be further configured to generate a respective score for each customer based upon a weighted average of the support agent feedback data from the different groups of support agents, and rank the customers based upon the scores. Moreover, the server may be further configured to update the scores on a periodic basis, for example.

A related method may include, at a server configured to communicate with a plurality of first client devices associated with customers and a plurality of second client devices associated with support agents, establishing support sessions between the first client devices and the second client devices via a communications network based upon customer support requests from the first client devices, collecting customer feedback data on the support agents from the first client devices responsive to the support sessions, and collecting support agent feedback data on the customers from the second client devices responsive to the support sessions. The method may further include, at the server, ranking the support agents based upon the customer feedback, ranking the customers based upon the support agent feedback, and assigning the support agents to customers as customer requests are received based upon the rankings of available support agents and the rankings of the customers making the customer requests.

A related non-transitory computer-readable medium is for a server configured to communicate with a plurality of first client devices associated with customers and a plurality of second client devices associated with support agents. The non-transitory computer-readable medium may have computer-executable instructions for causing the server to perform steps including establishing support sessions between the first client devices and the second client devices via a communications network based upon customer support requests from the first client devices, collecting customer feedback data on the support agents from the first client devices responsive to the support sessions, and collecting support agent feedback data on the customers from the second client devices responsive to the support sessions. The steps may further include ranking the support agents based upon the customer feedback, ranking the customers based upon the support agent feedback, and assigning the support agents to customers as customer requests are received based upon the rankings of available support agents and the rankings of the customers making the customer requests.

DETAILED DESCRIPTION

The present disclosure relates to a computing infrastructure for assigning support agents to customers for support sessions. By way of background, typical technical support computing systems provide only one way of giving feedback to technical support personnel (e.g., engineers) based upon surveys filled out by customers. In such systems, an incomplete view of the customer interaction cycle is presented in that it only includes feedback from the customer perspective. Additionally, some customer support infrastructures do not provide for surveying support agents from different departments or groups outside of technical support, such as contract or education/training agents, for example. As will be discussed further below, the system and methods set forth herein advantageously provides a bi-directional approach to a customer interaction infrastructure that may span multiple departments within a support organization, and provide enhanced clarity with respect to the current status of different customers. This may allow support organizations to pay increased attention to customers with higher importance levels and assign these customers with the appropriate support agents.

The example approaches set forth herein allow for both customer and support agent feedback that is used to calculate scores so that support agents and customers may both be ranked, allowing the computing infrastructure to more accurately assign customers with support agents automatically by matching of these rankings. Moreover, the present approaches advantageously allow for the automated rankings to be applied across different groups or types of support agents within a support organization to provide more accurate scoring of customers utilizing the support infrastructure. This may advantageously provide for a faster allocation of more skilled or experienced support to priority customers in an automated fashion by the computing infrastructure.

Figure 1:
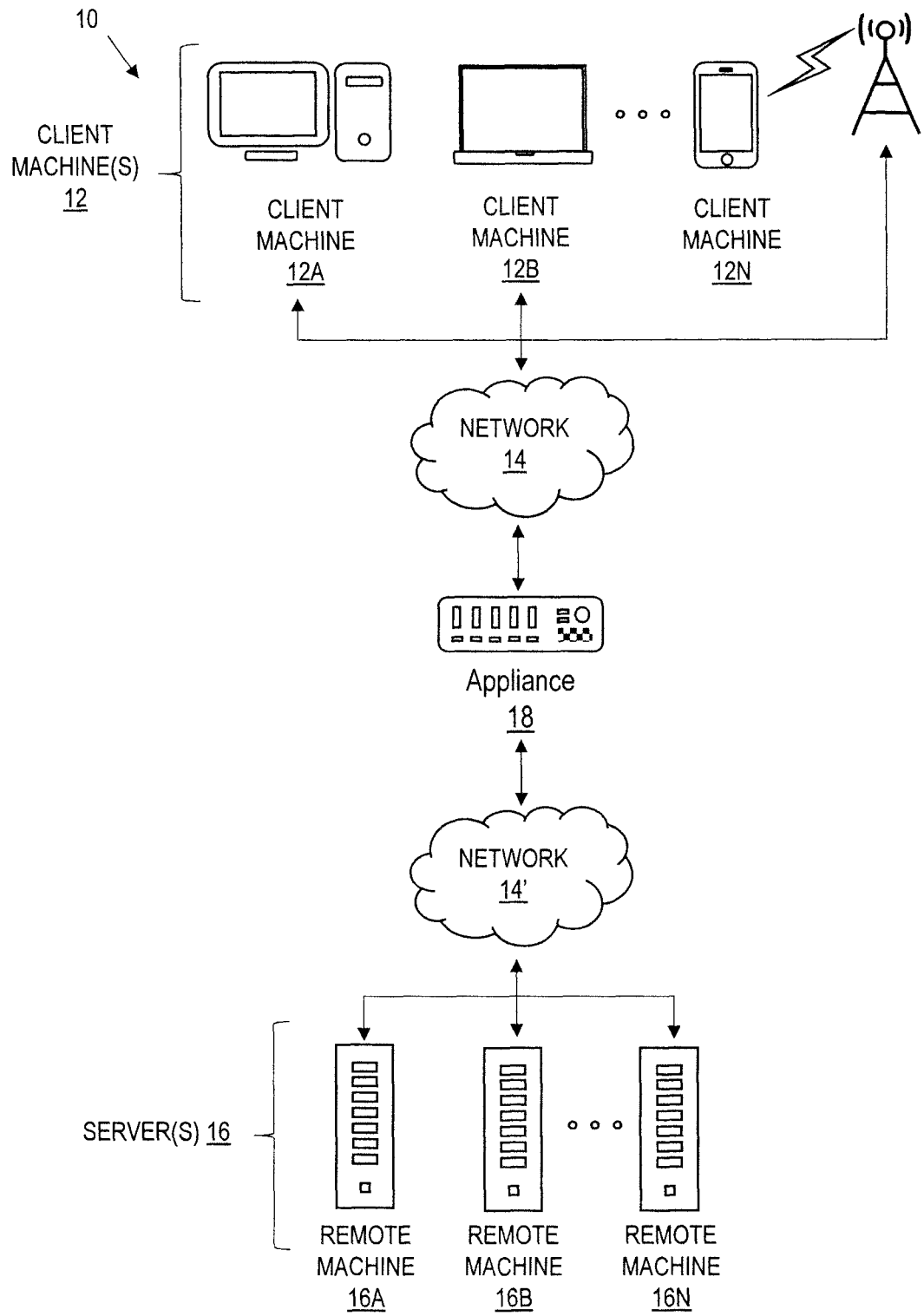
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
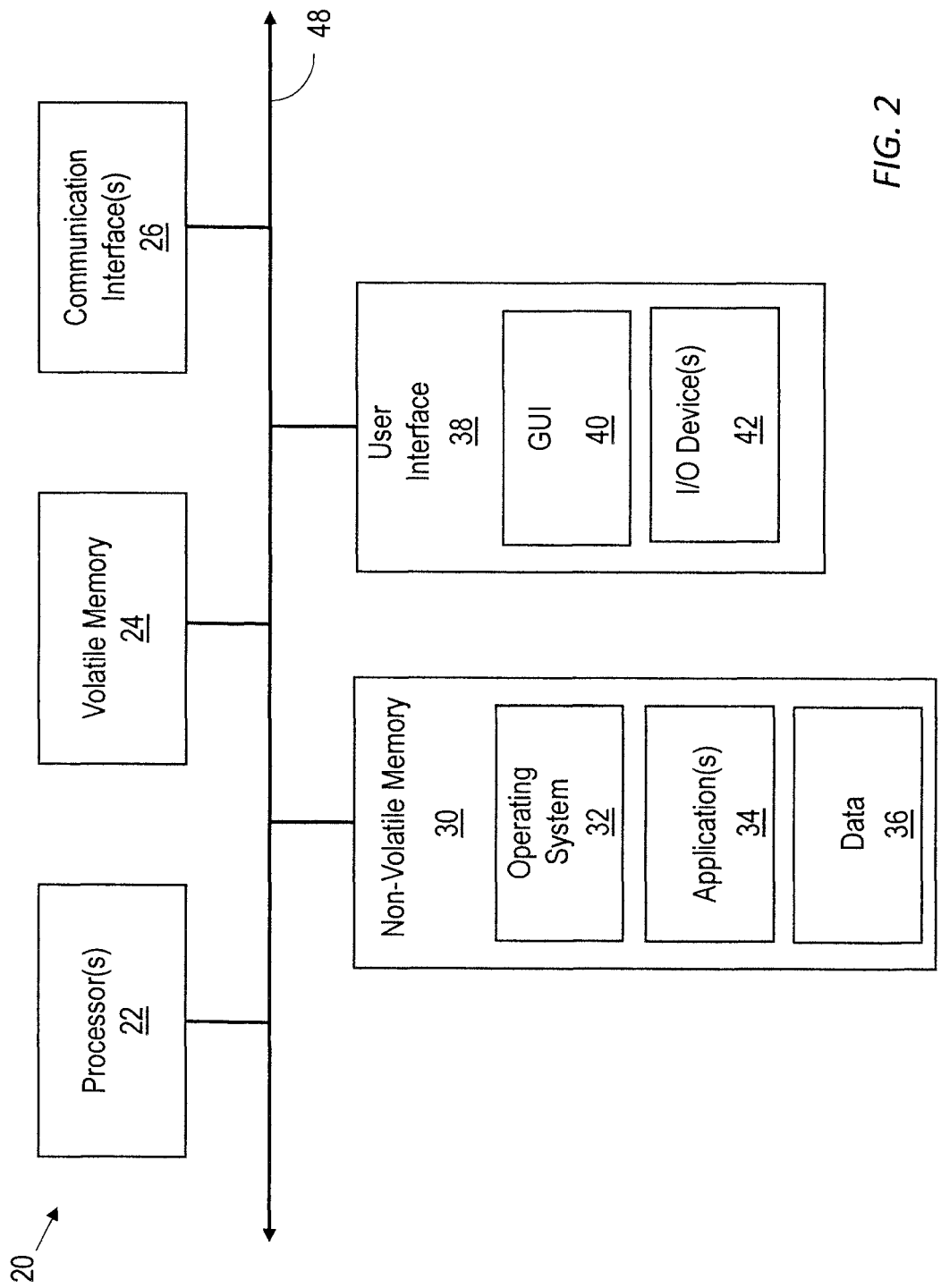
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
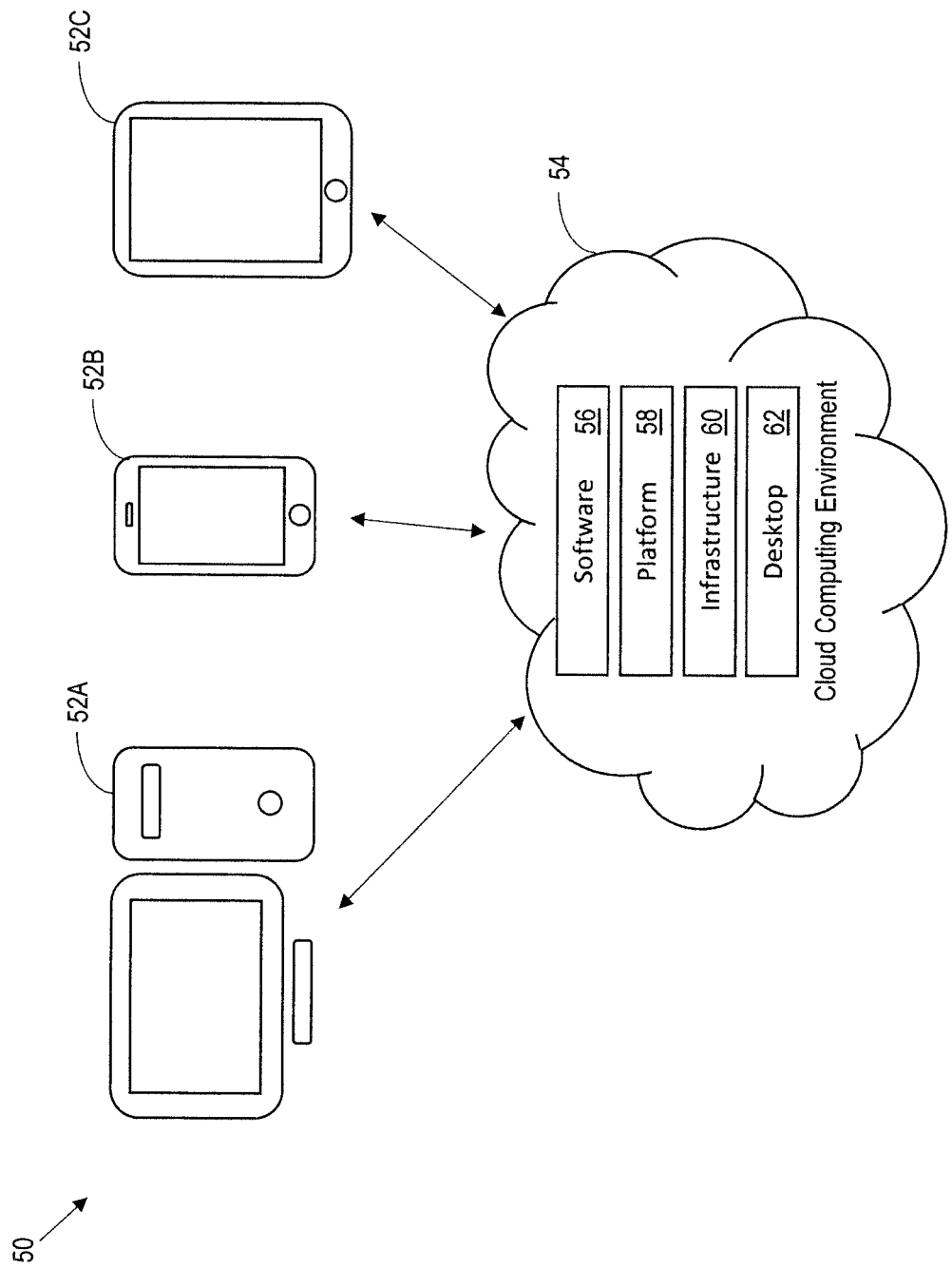
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
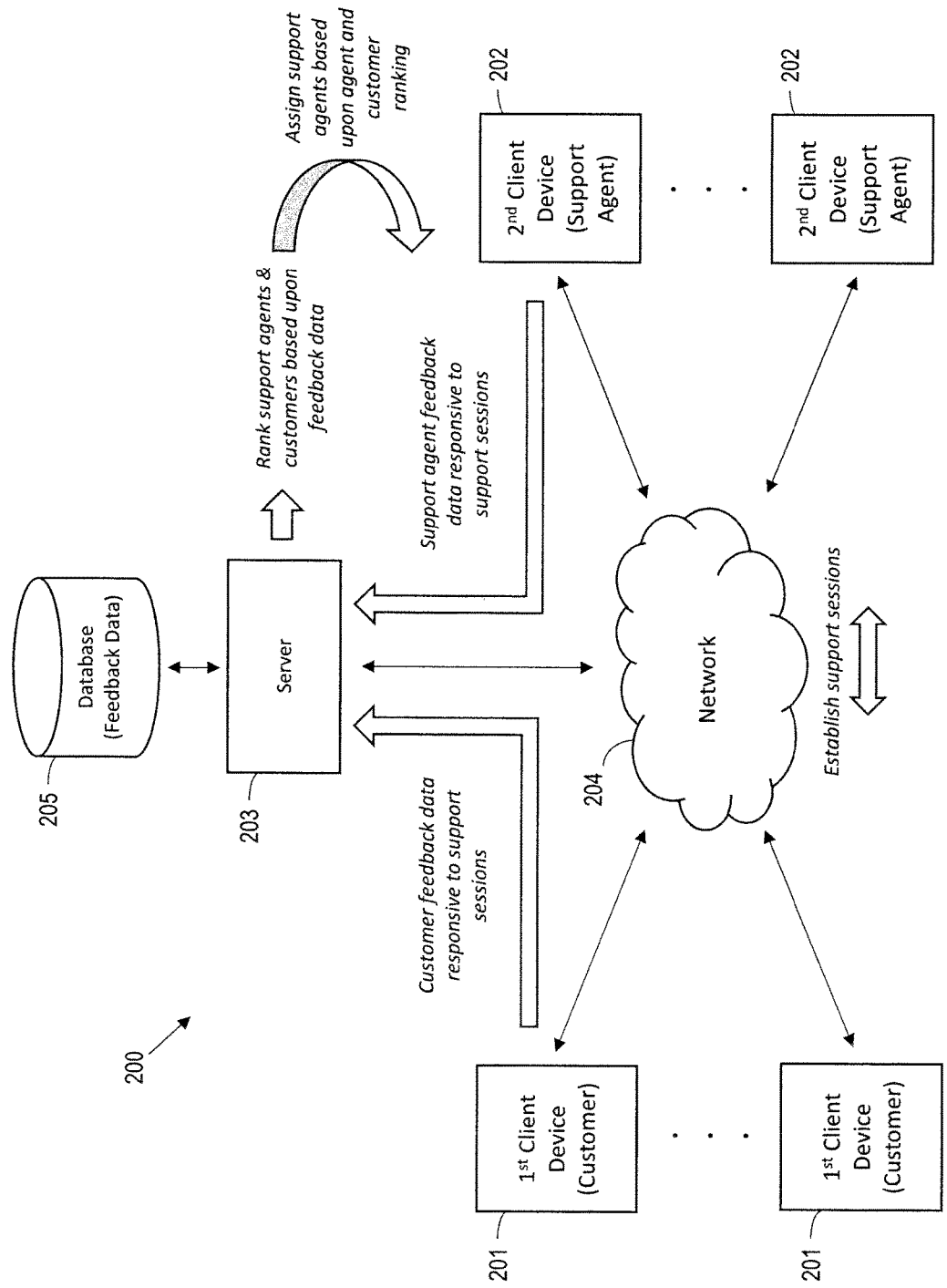
FIG. 4 is a schematic block diagram of a computing system providing support session assignment between support agent client devices and customer client devices in accordance with an example embodiment.

Turning to FIG. 4, a computing system 200 is first described which provides for enhanced efficiency and resource allocation in a customer support infrastructure based upon bi-directional feedback from customers and support agents. The system 200 illustratively includes a plurality of first client devices 201 associated with customers, a plurality of second client devices 202 associated with support agents, and a server 203 configured to communicate with the first and second client devices. As noted above, the first and second client devices 201, 202 may be smartphones, desktop or laptop computers, tablet computers, etc. The server 203 may also be similar to those computing devices described further above including a processor and associated non-transitory computer-readable medium having computer executable instructions for performing the operations described herein. The server 203 may also be implemented as part of a cloud computing configuration as described above in some embodiments.

The server 203 is configured to establish support sessions (e.g., online, videoconference, teleconference) between the first client devices 201 and the second client devices 202 via a communications network 204 (e.g., the Internet) based upon customer support requests from the first client devices 201. Moreover, the server 203 may also be configured to collect customer feedback data on the support agents the customers interact with from the first client devices 201 responsive to the support sessions, and also collect support agent feedback data on the customers the support agents interact with from the second client devices 202 responsive to the support sessions. For example, the server 203 may cause the first and second client devices 201, 202 to display a survey on monitors associated therewith as support sessions are completed or concluded, through which the customers and support agents may supply their feedback data. Various factors may be used for evaluating the performance or value of customer and support agent attributes, which will be discussed further below.

The server 203 ranks the support agents based upon the customer feedback data by generating respective agent scores from the customer feedback data. Moreover, the server 203 also ranks the customers based upon the support agent feedback data by generating respective customer scores from the support agent feedback data, as will be discussed further below. As such, the server 203 is advantageously able to assign the support agents (via their corresponding second client devices 202) to customers (via their respective first client devices 201) as customer requests are received based upon the rankings of available support agents and the rankings of the customers making the customer requests. The system 30 accordingly provides a two-way feedback measurement approach that allows for the automated matching of appropriate support agents to customers based upon rankings generated from this feedback.

Figure 5:
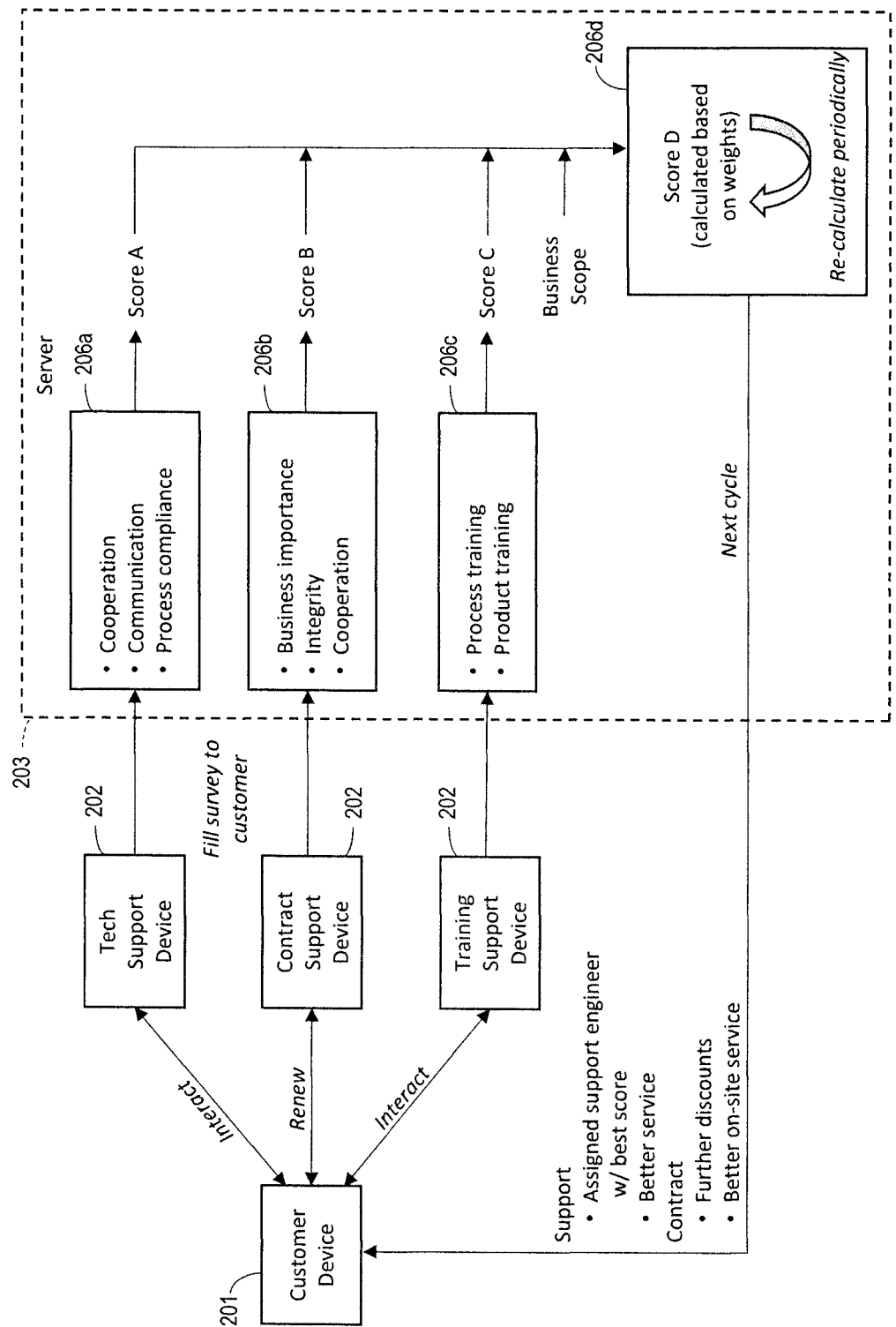
FIGS. 5 and 6 are schematic block diagrams of an example implementation of the system of FIG. 4 illustrating customer and support agent ranking operations by the server.
Figure 6:
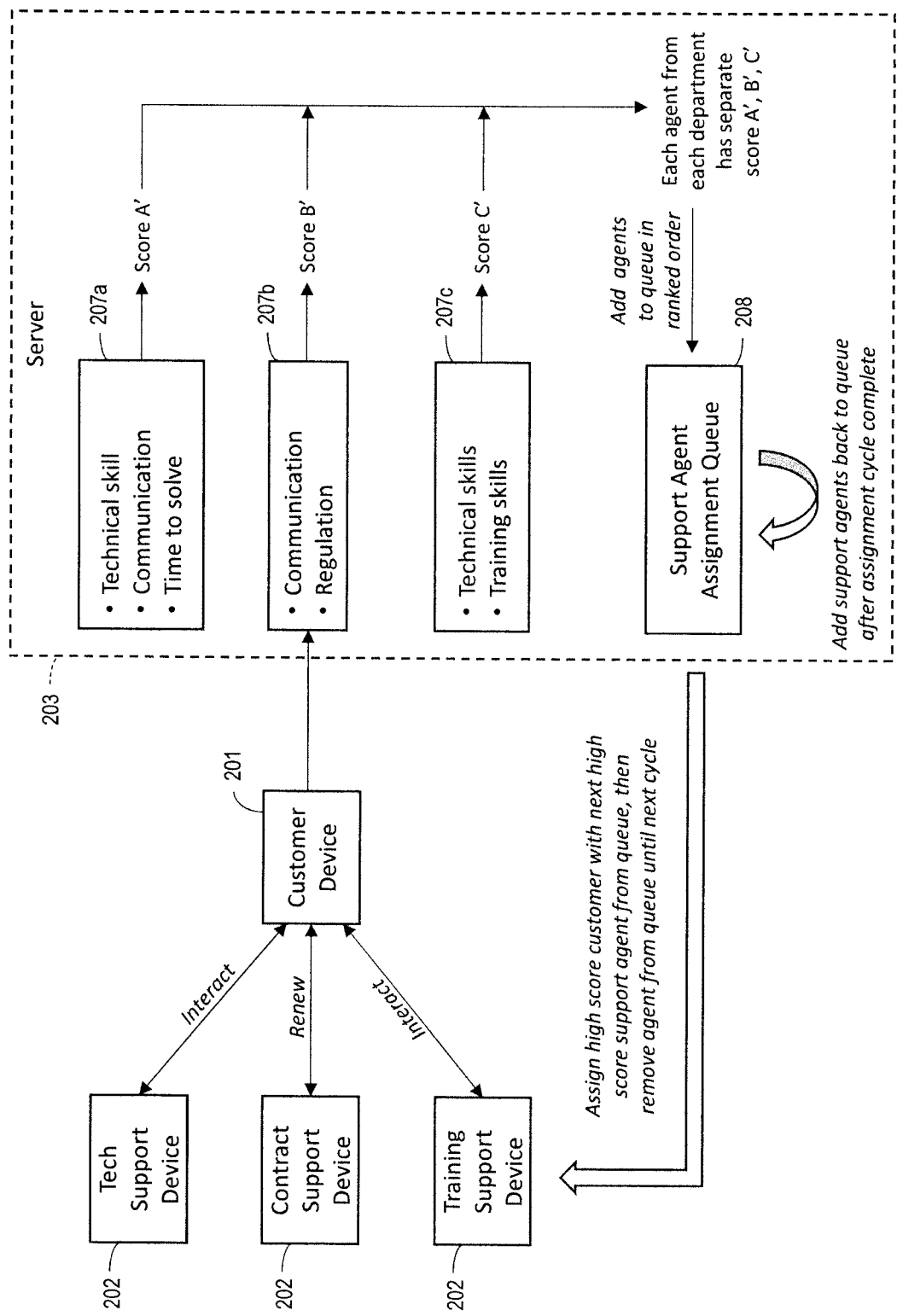

An example bi-directional feedback approach for the system 200 is now described with reference to FIGS. 5 and 6. The support agent feedback cycle is first described with reference to FIG. 5. Here, the customer (via one or more customer client devices 201) interacts with the tech support team, contract support team, and training or education support team of an organization. By way of example, such organizations may include computer infrastructure or information technology (IT) providers, software providers, manufacturers, utility providers, etc. As noted above, the various support team members interact with the customer via their support agent client devices 202.

In the present example, after a team member(s) from any of the different support teams has an interaction with a customer, the team member may provide feedback data (e.g., responsive to survey questions, or as a form the support agent may open and fill out on her client device 202). In this case, the tech support team engineer fills out a survey with respect to the customer which includes one or more questions related to: a cooperation level of the customer (e.g., how well the customer cooperates with the tech support agent); communication skills (e.g., how well the customer communicates with the support agent); and process compliance (e.g., how well the customer follows the processes or recommendations specified by the tech support team or not).

A scoring module 206a of the server 203 may accordingly calculate a score for the customer from the tech support team interaction (Score A) based upon the feedback provided by the tech support agents. By way of example, tech support team members may assist customers with issues such as setup and installation, configuration, troubleshooting, account password resets, etc. More particularly, the scoring module may calculate the score based upon a weighted average of the feedback for the different categories noted above. One example weighting scheme is to weight the cooperation level at 40%, and the communication skills and process compliance each at 30% when calculating Score A. However, it will be appreciated that other feedback criteria or categories and combinations thereof may be used in different embodiments, as well as different weights, if desired.

Similarly, contract team agents may also fill out a survey based upon support sessions with the customer. By way of example, contract team agents may be responsible for helping customers with billing inquiries, numbers of licenses required for subscription services, etc. Here again, various criteria and weights may be used in an example implementation by a scoring module 206b of the server 203 to generate a second Score B. In an example embodiment, these may include: business importance of the customer (e.g., the amount or size of business deals with this customer, frequency of purchases, etc.); integrity (e.g., whether the customer complies with applicable regulations); and cooperation (e.g., how well the customer cooperates with the contract support agent). One example weighting scheme is to weight the business importance at 50%, integrity at 30%, and cooperation at 20% when calculating Score B. However, it will be appreciated that other feedback criteria or categories and combinations thereof may be used in different embodiments, as well as different weights, if desired.

In addition, training or education team agents may also fill out a survey based upon support sessions with the customer. By way of example, training team agents may be responsible for helping customers with how to use software, hardware, equipment, etc. Once again, various criteria and weights may be used in an example implementation by a scoring module 206c of the server 203 to generate a third Score C. In an example embodiment, one of these factors may include attendance at product or process related training sessions. Other factors may include a participation level during training sessions, as well as cooperation. One example weighting scheme is to weight the attendance at 50%, participation at 25%, and cooperation at 25% when calculating Score C. However, it will be appreciated that other feedback criteria or categories and combinations thereof may be used in different embodiments, as well as different weights, if desired.

The server 203 further illustratively includes a scoring module 206d that calculates a final Score D based upon Score A, Score B and Score C, as well as an optional business scope parameter(s) relating to activities performed by the customer. The business scope parameters may be used to define the business relevance between the customer and support provide, and may also be used to recalculate and update the customer's score. In accordance with one example embodiment, the Score D may be calculated as follows:

$$\text{Score } D = \text{Score } A \text{ (Weight 20\%)} + \text{Score } B \text{ (Weight 40\%)} + \text{Score } C \text{ (Weight 20\%)} + \text{extra business scope (Weight 20\%)}.$$

The Score D may then be used to assign the appropriate resource (agent) based upon the score of the customer requesting the session and the support agent scores, which will be discussed further below. For example, higher customer scores may result in the assignment of tech support/contract/training agents that also have higher scores. Furthermore, the customer scores may be recalculated on a schedule or periodic basis. For example, every six months the scoring module 206d may recalculate the customer's Score D, meaning that the Score D for the customer will change over time based upon continued interactions with the customer. This will allow those customers who have a relatively low score to improve their scores over time.

It should be noted that recalculating or updating customer scores may also be performed based upon a weighted ranking algorithm in some embodiments. In this regard, a business scope score may be calculated which includes another factor (Weight 50%)+a recalculation factor (Weight 50%). The other factor may be used to identify the business relevance between the support provider and customer side. Higher business relevance results in a higher score. With respect to the recalculation factor, for those customers who want to purchase more product and services to the vendor side, this may be a positive value for the factor. The more money they spend and invest on this, the higher the recalculation factor value comes. For those customers who do not plan to purchase more product or services from the vendor side, then it is a negative value.

It should also be noted that "customers" may be individual users in some cases, or institutional users (corporations, organizations, government agencies, etc.) in other cases. For institutional users, this means that the above-noted scores may be updated based upon support session interactions with different employees or members of a given institutional customer. That is, for an institutional customer, the customer's overall score may be affected based upon each interaction with an employee or member of the institution.

The customer feedback cycle is now described with reference to FIG. 6. After customers interact with tech, contract, and training support teams in support sessions via the customer and support team client devices 201, 202, the server 203 prompts customers to complete a survey (e.g., an online survey) to score the support team members they interact with. For example, with respect to tech support engineers, the customer may fill in the survey based upon metrics such as the following: technical skill; communication skill; time to solve or resolve the issue, etc. From this information, a scoring module 207a of the server 203 may generate a Score A' for each tech support engineer.

Similarly, the server 203 may prompt customers to fill out a survey for contract agents, which may be based upon metrics such as communication skill, regulation compliance, etc. From this information, a scoring module 207b of the server 203 may generate a Score B' for each contract support agent. Additionally, the server 203 may further prompt customers to fill out a survey for training agents, which may be based upon metrics such as technical skill, training skill, etc. From this information, a scoring module 207c of the server 203 may generate a Score C' for each training agent.

The server 203 may accordingly calculate and continuously update each of the scores A', B' and C' based upon the repeated interactions of the various support agents with different customers. Based upon the current values of the Scores A', B' and C', the server 203 will automatically assign the most suitable support resources to the appropriate customers. For example, the tech support engineers, contract agents, and training agents with higher scores may be assigned from one or more support agent queues 208 to customers with higher scores.

Figure 7:
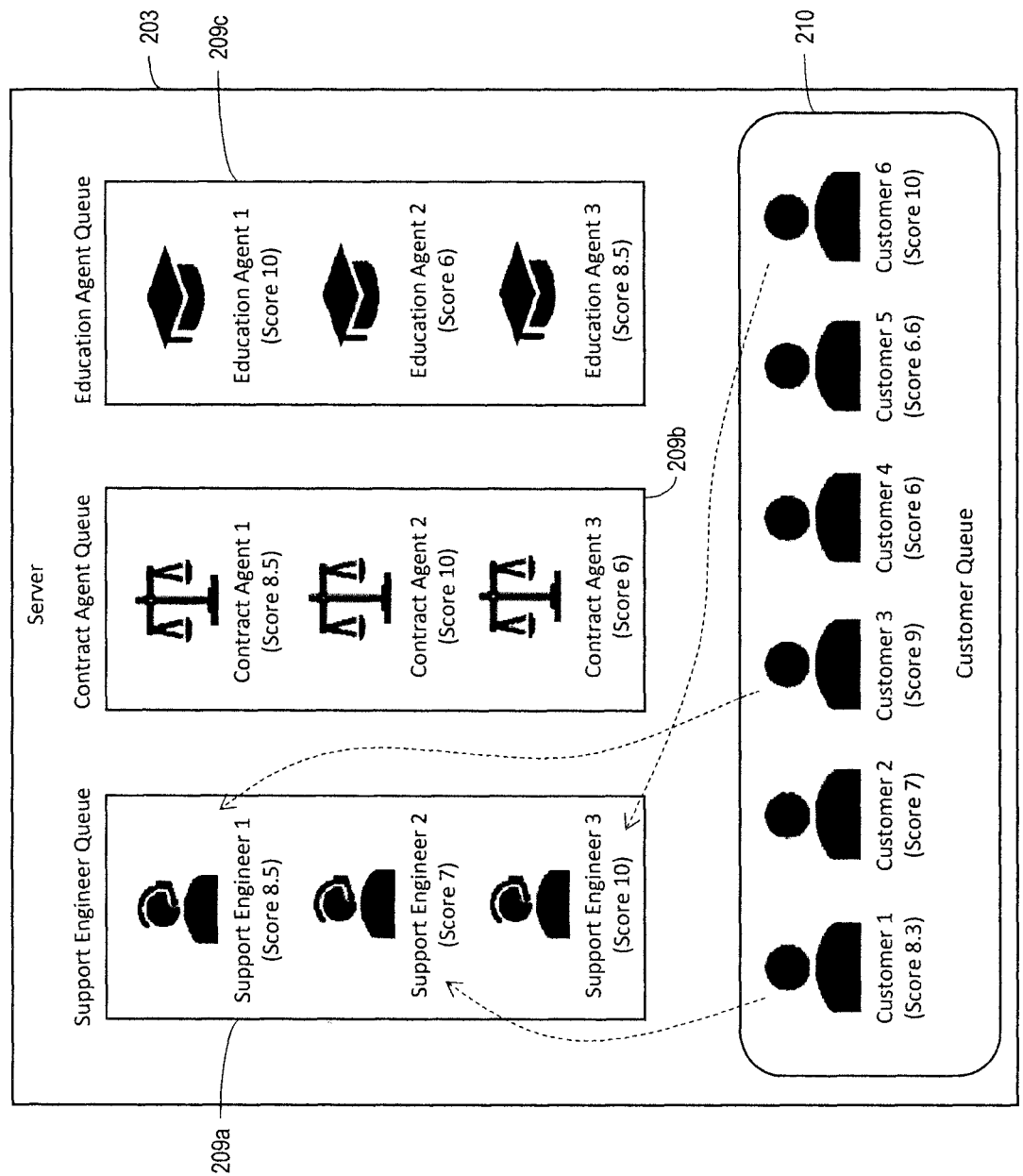
FIGS. 7-9 are schematic block diagrams of an example implementation of the server of FIGS. 5 and 6 performing support agent client device assignment based upon the customer and support agent rankings.
Figure 8:
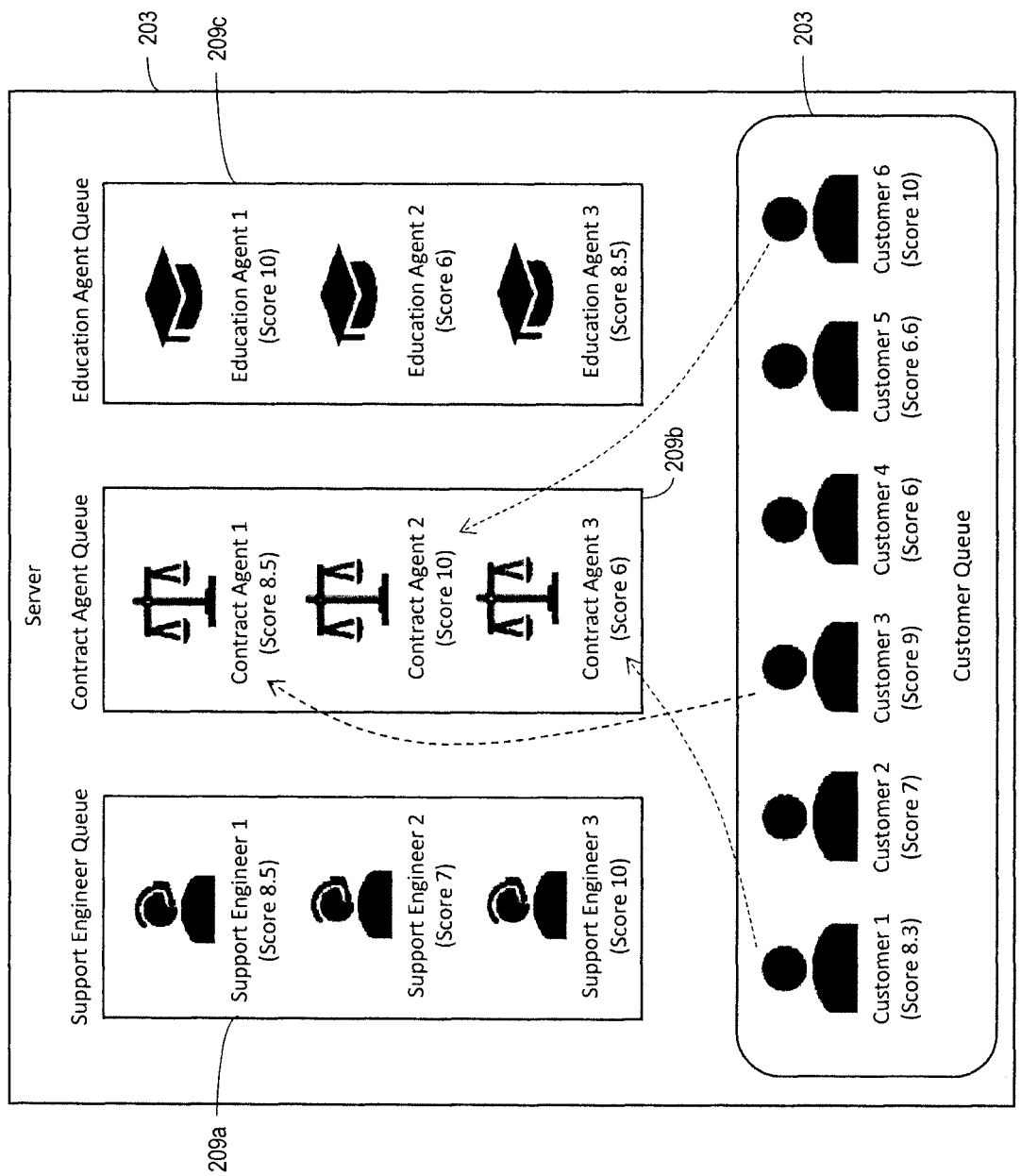
Figure 9:
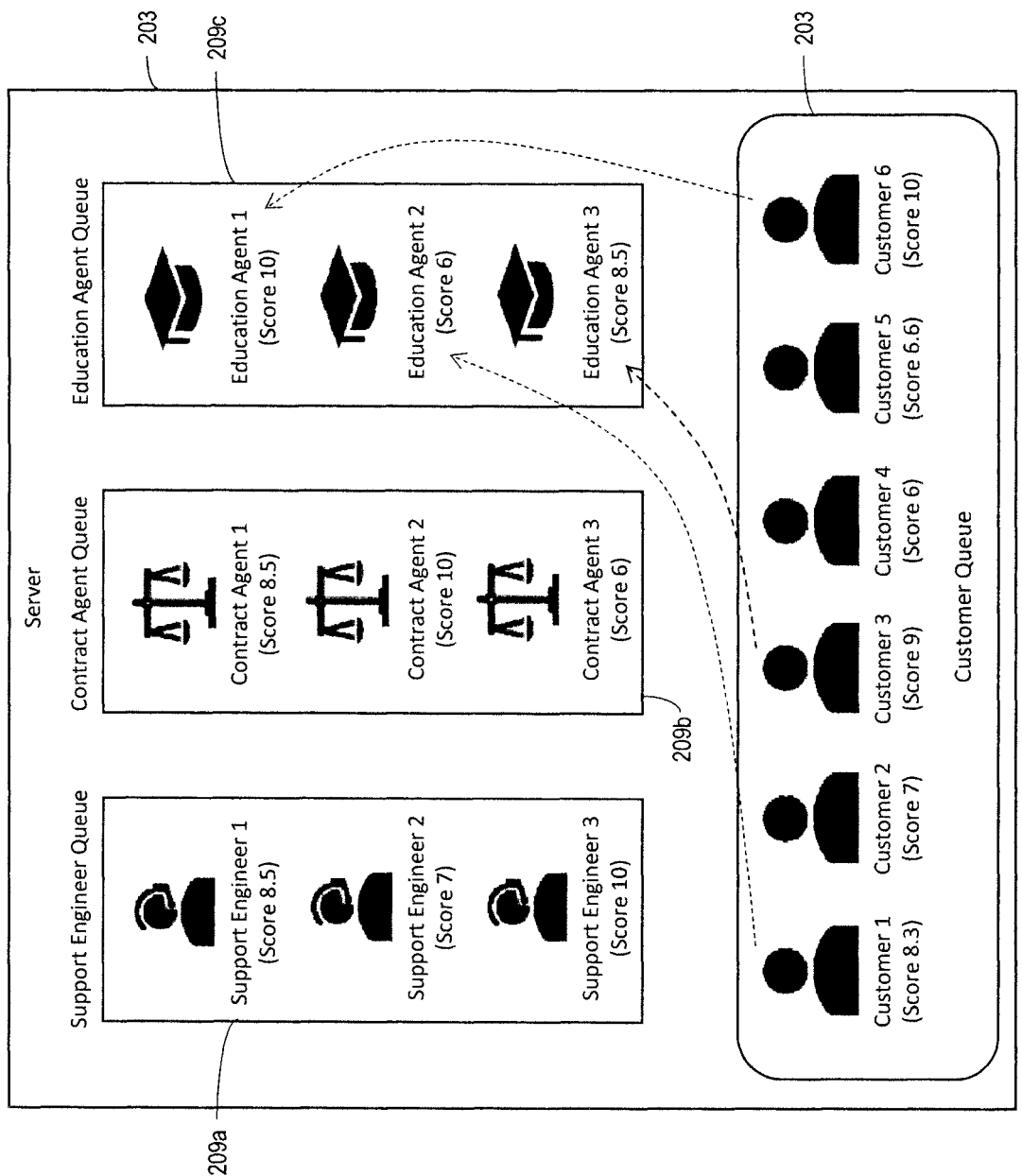

Turning to FIGS. 7-9, an example customer-to-support agent assignment workflow for tech support engineers, contract agents, and education agents, respectively, is now described. In the illustrated example, there are three queues 209a, 209b, 209c at the server 203 for the tech support engineers, contract agents, and education agents, respectively. Moreover, there are six customers (Customer 1-Customer 6) waiting in a customer queue 210 at the server 203 for support sessions.

As seen in FIG. 7, Customer 6 has the highest score of all the customers in the queue 210 (Score 10), and is accordingly assigned Customer Support Engineer 3 who has the highest score (Score 10) of the available engineers in the queue 209a. Similarly, Customer 3 with the next highest score (Score 9) is assigned to Support Engineer 1 (Score 8.5), and Customer 1 (Score 8.3) is assigned Support Engineer (Score 7). Similarly, in the example of FIG. 8, Customer 6 (Score 10) is assigned to Contract Agent 2 (Score 10), Customer 3 (Score 9) is assigned to Contract Agent 1 (Score 8.5), and Customer 1 (Score 8.3) is assigned to Contract Agent 3 (Score 6). Additionally, in the example of FIG. 9, Customer 6 (Score 10) is assigned to Education Agent 1 (Score 10), Customer 3 (Score 9) is assigned to Education Agent 3 (Score 8.5), and Customer 1 (Score 8.3) is assigned to Contract Agent 2 (Score 6).

In this example, it will be appreciated that the support agents and customers have been ranked on a common numerical scale. That is, their scores are all calculated on a 0 to 10 scale, and the server 203 assigns the support agents to customers having the closest ranking to one another on the same 0 to 10 scale. However, it will be appreciated that other scales or ranking schemes may be used in different embodiments.

It should be noted that the customers in the queue 210 may be taken out of order in some instances from the order in which they were placed in the queue. That is, customers may be assigned to support agents in a first-in, first-out (FIFO) fashion, or the customers in the queue 210 with higher scores may be assigned support agent sessions first, or out of order with respect to lower-ranked customers also in the queue, even though such other customers were in the queue first.

As discussed above, as soon as the support agents are assigned to a customer, those support agents are removed from their respective queues 209a-209c. These support agents will be added back to their respective queues 209a-209c once all of the support agents in their respective queues are assigned one customer in the current assignment cycle. That is, the support session assignment process also advantageously provides for load balancing as well. The agent assignment cycle may continuously repeat, and the server 203 may adjust the queues 209a-209c as support agents enter and exit the queue (e.g., as they start or leave work shifts).

Figure 10:
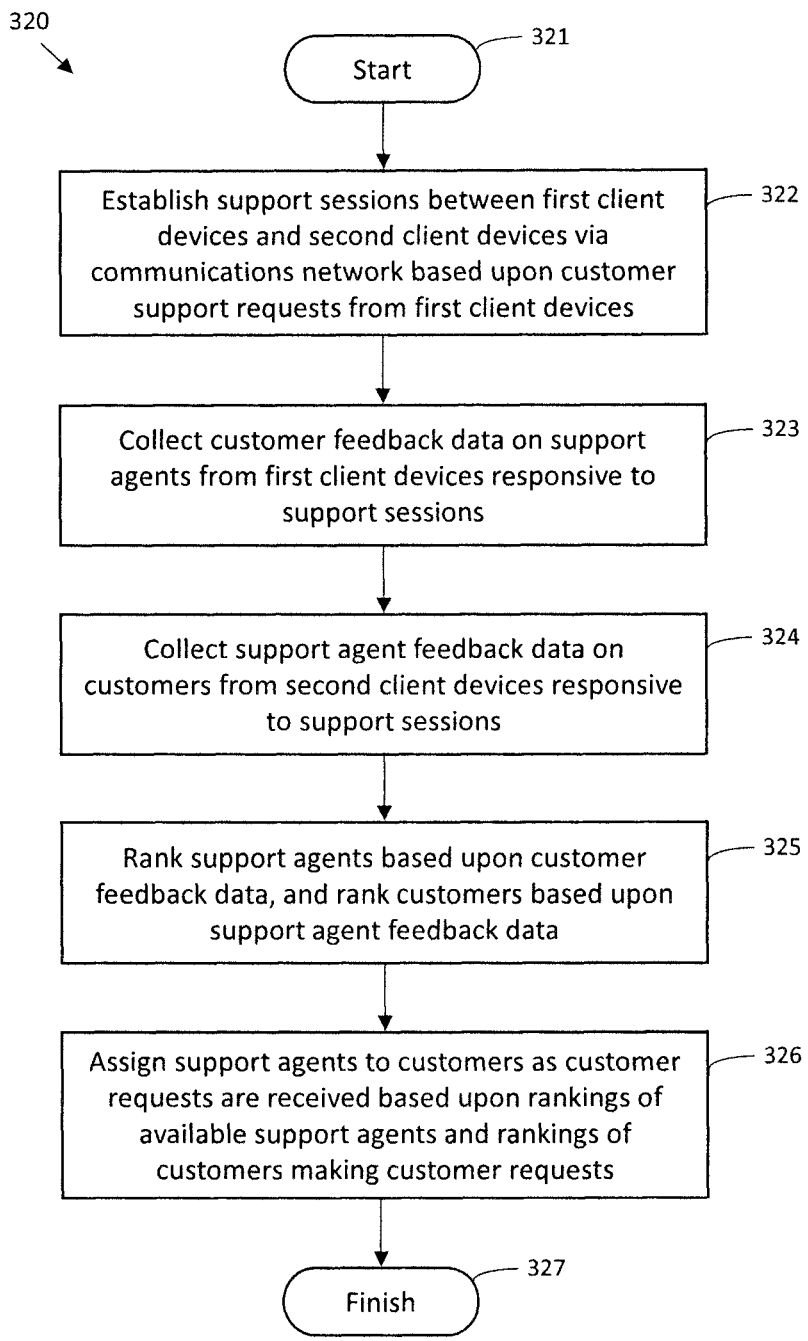
FIG. 10 is a flow diagram illustrating method aspects associated with the system of FIG. 4.

A related method is now described with reference to the flow diagram 320 of FIG. 10. Beginning at Block 321, the method illustrative includes, at the server 203, establishing support sessions between the first (customer) client devices 201 and the second (support agent) client devices 202 via the communications network 204 based upon customer support requests from the first client devices, at Block 322. The server 203 further collects customer feedback data on the support agents from the first client devices 201 responsive to the support sessions, at Block 323, and also collects support agent feedback data on the customers from the second client devices 202 responsive to the support sessions, at Block 324. The method further includes, at the server 203, ranking the support agents based upon the customer feedback and ranking the customers based upon the support agent feedback, at Block 325. Furthermore, the support agents are assigned to customers as customer requests are received based upon the rankings of available support agents and the rankings of the customers making the customer requests (Block 326), as discussed further above. The method of FIG. 10 illustratively concludes at Block 327.

The above-described system 200 and methods advantageously provide a computing infrastructure in which customers are provided with a more accurate assignment and service level by measuring the service level across multiple dimensions. After repeated rounds of support agent assignment cycles and score calculations, the customer with the highest score may be assigned the highest scoring support/contract/education agent. From the perspective of support providers, their support agents will have a chance to learn about their own ability or skills based on the customer feedback data. This may help the support providers to allocate internal training to support agents in areas where further improvement or education is required.

Moreover, the example approaches set forth herein may provide a bi-directional feedback model so that both customers and support agents can have a score measuring performance as well as other important factors which are helpful for appropriate support agent allocation. Subsequent cycles of support agent assignment may be based upon the above-described score calculations and rankings to help ensure that high scoring customers (which may be considered more important customers in some contexts) can automatically be assigned with more highly ranked support agents.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
   a plurality of first client devices associated with customers;
   a plurality of second client devices associated with support agents; and
   server configured to communicate with the first and second client devices to
   establish support sessions between the first client devices and the second client devices via a communications network based upon customer support requests from the first client devices, the support sessions comprising at least one of video conferences and teleconferences;
   collect customer feedback data on the support agents from the first client devices responsive to the support sessions;
   collect support agent feedback data on the customers from the second client devices responsive to the support sessions and across a plurality of different support agent groups providing different types of feedback data;
   for each support agent group, automatically generate a first customer score for each customer based upon the feedback data for the customer from the support agent group;
   for each customer, automatically generate a second customer score based upon the first customer scores from each support group;

automatically rank the support agents based upon the customer feedback data, and automatically rank the customers based upon the second customer scores;

automatically assign the support agents to customers as customer requests are received based upon the rankings of available support agents and the rankings of the customers making the customer requests; and establish a connection between the first and second client devices to support sessions via the communications network based upon the assignments.

2. The computing system of claim 1 wherein the server is further configured to:

add the support agents to an assignment queue;

remove the support agents from the assignment queue upon assignment to a customer; and add the support agents back to the assignment queue after the assignment queue is empty.

3. The computing system of claim 1 wherein the support agents and customers are ranked on a common numerical scale, and wherein the server assigns the support agents to customers having the closest ranking to one another on the common numerical scale.

4. The computing system of claim 1 wherein the server is configured to automatically generate the first scores for each customer based upon a weighted average of the support agent feedback data for the customer from respective support agent groups.

5. The computing system of claim 1 wherein the server is further configured to update the first and second scores on a periodic basis.

6. A method comprising:

at a server configured to communicate with a plurality of first client devices associated with customers and a plurality of second client devices associated with support agents, establishing support sessions between the first client devices and the second client devices via a communications network based upon customer support requests from the first client devices, the support sessions comprising at least one of video conferences and teleconferences;

collecting customer feedback data on the support agents from the first client devices responsive to the support sessions;

collecting support agent feedback data on the customers from the second client devices responsive to the support sessions and across a plurality of different support agent groups providing different types of feedback data;

for each support agent group, automatically generating a first customer score for each customer based upon the feedback data for the customer from the support agent group;

for each customer, automatically generating a second customer score based upon the first customer scores from each support group;

automatically ranking the support agents based upon the customer feedback, and automatically ranking the customers based upon the second customer scores;

automatically assigning the support agents to customers as customer requests are received based upon the rankings of available support agents and the rankings of the customers making the customer requests; and establishing a connection between the first and second client devices to support sessions via the communications network based upon the assignments.

7. The method of claim 6 further comprising, at the server:

adding the support agents to an assignment queue;

removing the support agents from the assignment queue upon assignment to a customer; and adding the support agents back to the assignment queue after the assignment queue is empty.

8. The method of claim 6 wherein the support agents and customers are ranked on a common numerical scale, and wherein assigning comprises assigning the support agents to customers having the closest ranking to one another on the common numerical scale.

9. The method of claim 6 wherein automatically generating comprises automatically generating the first scores for each customer based upon a weighted average of the support agent feedback data for the customer from respective support agent groups.

10. The method of claim 6 further comprising, at the server, updating the first and second scores on a periodic basis.

11. The method of claim 6 wherein the support agent feedback data on the customers is based upon at least one of a cooperation level, communication skill level, process compliance level, and business importance level.

12. The method of claim 6 further comprising, at the server, generating a respective score for each support agent based upon the customer feedback data, and ranking the support agents based upon the scores.

13. The method of claim 12 further comprising, at the server, updating the first and second scores as a new customer feedback data is collected.

14. A non-transitory computer-readable medium for a server configured to communicate with a plurality of first client devices associated with customers and a plurality of second client devices associated with support agents, the non-transitory computer-readable medium having computer-executable instructions for causing the server to perform steps comprising:

establishing support sessions between the first client devices and the second client devices via a communications network based upon customer support requests from the first client devices, the support sessions comprising at least one of video conferences and teleconferences;

collecting customer feedback data on the support agents from the first client devices responsive to the support sessions;

collecting support agent feedback data on the customers from the second client devices responsive to the support sessions and across a plurality of different support agent groups providing different types of feedback data;

for each support agent group, automatically generating a first customer score for each customer based upon the feedback data for the customer from the support agent group;

for each customer, automatically generating a second customer score based upon the first customer scores from each support group;

automatically ranking the support agents based upon the customer feedback, and automatically ranking the customers based upon the second customer scores;

automatically assigning the support agents to customers as customer requests are received based upon the rankings of available support agents and the rankings of the customers making the customer requests; and establishing a connection between the first and second client devices to support sessions via the communications network based upon the assignments.

15. The non-transitory computer-readable medium of claim 14 having further computer-executable instructions for causing the server to perform steps comprising:
adding the support agents to an assignment queue;
removing the support agents from the assignment queue upon assignment to a customer; and
adding the support agents back to the assignment queue after the assignment queue is empty.

16. The non-transitory computer-readable medium of claim 14 wherein the support agents and customers are ranked on a common numerical scale, and wherein assigning comprises assigning the support agents to customers having the closest ranking to one another on the common numerical scale.

17. The non-transitory computer-readable medium of claim 14 wherein automatically generating comprises automatically generating the first scores for each customer based upon a weighed average of the support agent feedback data for the customer from repsective support agent groups.

* * * * *